United States Patent
Kaplan et al.

(10) Patent No.: US 11,924,338 B2
(45) Date of Patent: Mar. 5, 2024

(54) SPLIT RANDOM NUMBER GENERATOR

(71) Applicant: Advanced Micro Devices, Inc., Santa Clara, CA (US)

(72) Inventors: David A Kaplan, Austin, TX (US); Paul Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 329 days.

(21) Appl. No.: 17/089,493

(22) Filed: Nov. 4, 2020

(65) Prior Publication Data
US 2022/0141011 A1    May 5, 2022

(51) Int. Cl.
G06F 7/58      (2006.01)
H04L 9/08      (2006.01)

(52) U.S. Cl.
CPC .............. *H04L 9/0869* (2013.01); *G06F 7/58* (2013.01); *G06F 7/588* (2013.01)

(58) Field of Classification Search
CPC ..................................................... G06F 7/58
See application file for complete search history.

(56) References Cited

U.S. PATENT DOCUMENTS

| | | | |
|---|---|---|---|
| 9,544,139 B2* | 1/2017 | Cox | G06F 7/588 |
| 2008/0263117 A1* | 10/2008 | Rose | H04L 9/0869 |
| | | | 713/1 |
| 2012/0179735 A1 | 7/2012 | Ferguson et al. | |
| 2014/0344321 A1 | 11/2014 | Hamilton et al. | |

FOREIGN PATENT DOCUMENTS

EP    3208968 A1 *   8/2017   .............. G06F 7/58

OTHER PUBLICATIONS

Ferguson Niels: "The Windows 10 random 1-20 number generation infrastructure", Oct. 1, 2019 (Oct. 1, 2019), XP055880070, Retrieved from the Internet: URL:https://download.microsoft.com/download/1/c/9/1c9813b8-089c-4fef-b2ad-ad80e79403ba/Whitepaper%20-%20The%20Windows%2010%20random%20number%20generation%20infrastructure.pdf [retrieved on Jan. 17, 2022] pp. 5-8.
International Search Report and Written Opinion, Application No. PCT/US2021/055277 dated Jan. 24, 2022.

* cited by examiner

*Primary Examiner* — Michael D. Yaary

(57) ABSTRACT

A computing system may implement a split random number generator that may use a random number generator to generate and store seed values in a memory for retrieval and use by one or more core processors to generate random numbers for secure processes within each core processor.

20 Claims, 3 Drawing Sheets

SPLIT RANDOM NUMBER GENERATOR

BACKGROUND

Many modern computing systems utilize random number generators for a variety of applications, including but not limited to games, signal and image processing, modeling of financial and scientific systems, equation solving, and computer security and cryptography. A random number generator operating within a computing system may generate a series of random numbers as a sequence of independent numbers falling within a given range of values, and with a specified distribution within that range. An ideal random number generator provides a stream of uniformly distributed, non-deterministic, independent bits having high entropy.

In some computing systems, a random number generator may be implemented in software. Such software random number generators often generate a sequence of numbers that is ultimately deterministic and are thus better characterized as pseudo random number generators; however, these solutions may utilize various techniques to decrease the predictability of the generated numbers. For example, the random number generator may utilize dynamic seed values from a high entropy source, such as data from the system clock, keystroke timing, mouse movements, etc., and incorporate this data to seed the random number generator's calculations to reduce or eliminate correlations and predictability.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the spirit and scope of the embodiments.

High quality random number generation is a critical part of many security applications, including key generation, elliptic curve cryptography (ECC), high-bandwidth digital content protection (HDCP), encryption, and other applications. Poor quality random numbers, which have low entropy, high correlations, and are predictable, may lead to security breaches and compromised systems.

Some applications, including but not limited to access control, identification, encryption, audio noise generation, etc., may benefit from a split random number generator that includes at least one single random number generator as an entropy source that provides every central processing unit (CPU) core with a unique seed value rather than each CPU generating a seed value for its own random number generator. One benefit, for example, of an embodiment of the split design is to achieve a tradeoff between having good performance through firmware implemented in individual random number generators that may be used in parallel, without consuming physical die area to duplicate independent hardware random number generators in every processor core.

Figure 1:
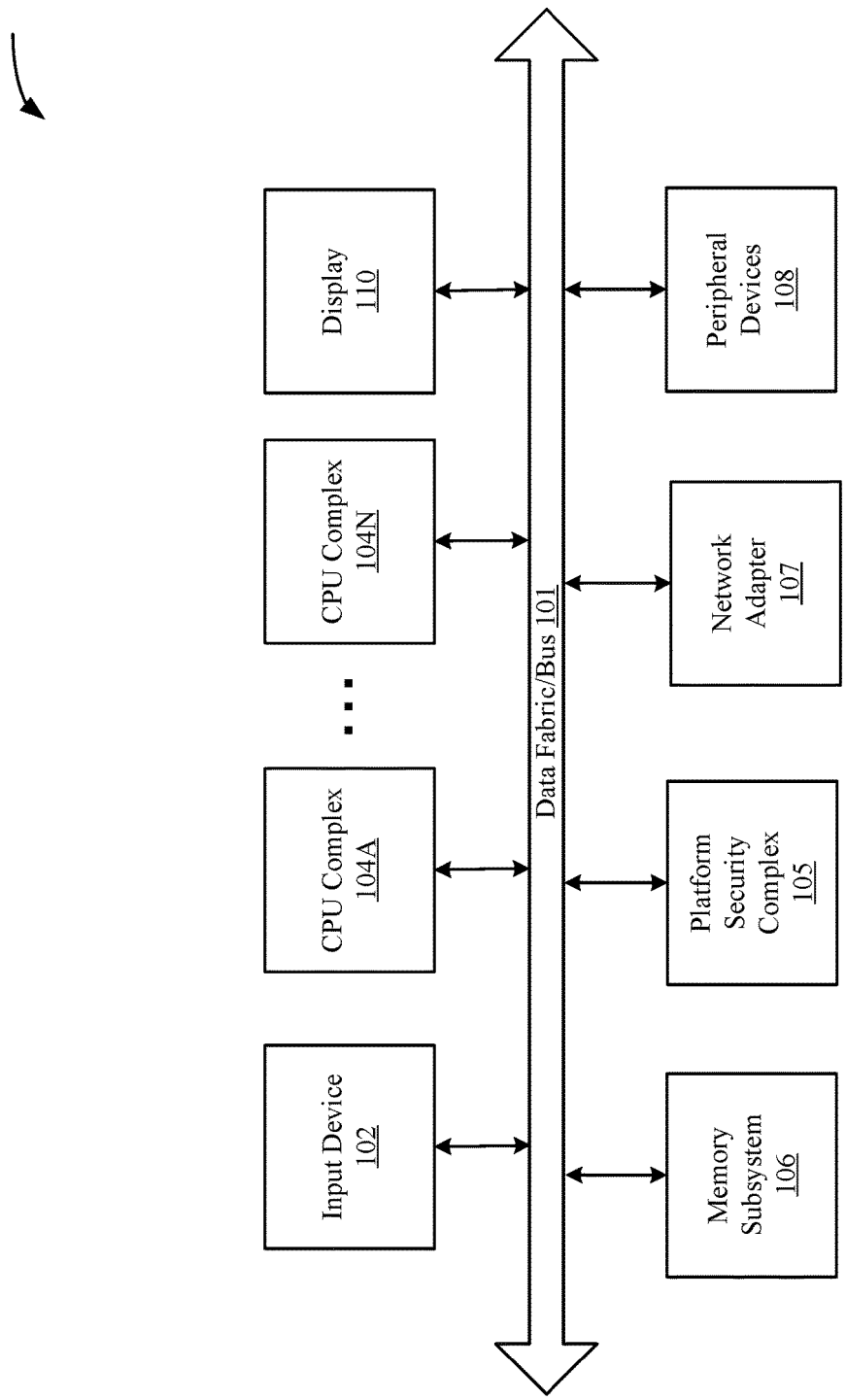
FIG. 1 illustrates an embodiment of a computer system in which a split random number generator is implemented.

FIG. 1 illustrates an embodiment of a computing system 100 in which a split random number generator is implemented. In general, the computing system 100 is embodied as any of a number of different types of devices, including but not limited to a laptop or desktop computer, mobile device, server, etc. The computing system 100 includes a number of components 102-108 that communicate with each other through a data fabric/bus 101. In computing system 100, each of the components 102-108 is configurable to communicate with any of the other components 102-108 either directly through the data fabric/bus 101, or via one or more of the other components 102-108. In various embodiments, some or all of the components 102-108 in computing system 100 may be contained within a single physical enclosure, such as a laptop or desktop chassis, or a mobile phone casing, while other devices may be external to the enclosure, such as the display 110 or peripheral devices 108. In other embodiments, some of the components, for example, the CPU complex 104A-N and the platform security complex 105 may reside on the same silicon substrate or as separate silicon within the same package within computing system 100.

In one embodiment, each CPU complex 104A-N includes processing components on a common integrated circuit substrate, such as one or more processor cores, which may include other specialized processing and programmable components and logic to implement, for example, a deterministic random bit generator (DRBG). In some embodiments, one or more CPU complexes 104A-N may also include a data parallel processor with a highly parallel architecture, such as one or more of graphics processing units (GPUs), digital signal processors (DSPs), field programmable gate arrays (FPGAs), application specific integrated circuits (ASICs), and so forth.

In various embodiments, the platform security complex 105 may include various components, such as a processor or microcontroller, a cryptographic coprocessor, random number generator, local memory, memory management unit, and various interfaces for communicating with other components outside the platform security complex 105, such as CPU complexes 104A-N. The platform security complex 105 functions include, but are not limited to, creating, monitoring and maintaining the security environment, managing the boot process, initializing various security related mechanisms, and monitoring the computing system 100 for any suspicious activity or events and responding accordingly. In one embodiment, the platform security complex 105 provides entropy, or random number generator seed values, for random number generators implemented in the CPU complexes 104A-N for secure processes, and compliance with international security standards (e.g., National Institute of Standards and Technology (NIST) security framework).

The computing system 100 may also include a memory subsystem 106 that includes memory devices used by one or more components of the computing system 100. For example, memory devices such as random-access memory (RAM) modules, dynamic random-access memory (DRAM) modules, read-only memory (ROM) modules, bit registers, hard disks, and other non-transitory computer-readable media. For convenience, herein the memory devices have been grouped into the memory subsystem 106, however, the memory devices, such as registers or ROMs for example, may be located throughout the computing system 100, and in some cases, external to the computing system 100, such as an external drive or other computer system.

The computing system 100 includes user interface devices for receiving information from or providing information to a user. Specifically, the computing system 100 includes an input device 102, such as a keyboard, mouse, touch-screen, or other device for receiving information from the user. The computing system 100 may display certain information to the user via a display 110, such as a monitor, light-emitting diode (LED) display, liquid crystal display, or other output device. Computing system 100 additionally includes a network adapter 107 for transmitting and receiving data over a wired or wireless network, and also includes one or more peripheral devices 108. The peripheral devices 108 may include mass storage devices, location detection devices, sensors, input devices, or other types of devices used by the computing system 100.

Some embodiments of computing system 100 may include fewer or more components than the embodiment illustrated in FIG. 1. For example, certain embodiments are implemented without any display 110 or input devices 102. Other embodiments may have more than one of a particular component. For example, an embodiment of computing system 100 may have additional network adapters or memory components, or communication paths, other than data fabric/bus 101, to communicatively couple devices together.

Figure 2:
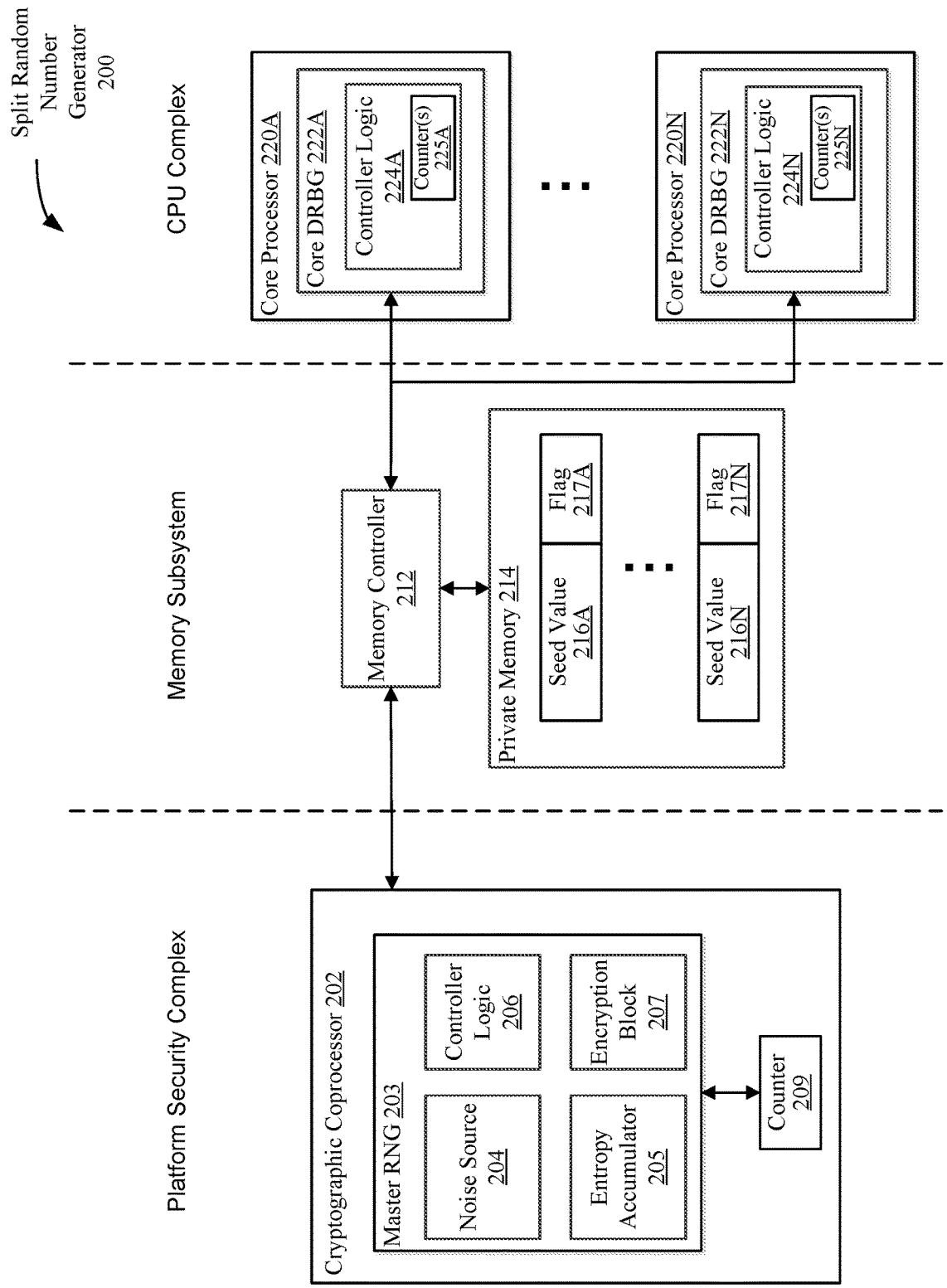
FIG. 2 is a block diagram of computer system components that illustrates an embodiment of a split random number generator.

One embodiment of a split random number generator includes a master random number generator to generate seed values to store in a memory accessible by each core random number generator within each CPU core. FIG. 2 illustrates an embodiment of a split random number generator 200 that includes a cryptographic coprocessor 202, private memory 214, and core processors 220A-220N. In one embodiment, the cryptographic coprocessor 202 resides in a platform security complex (e.g., platform security complex 105 of FIG. 1), the private memory resides in a memory subsystem (e.g., memory subsystem 106 of FIG. 1), and the core processors 220A-N reside in one or more CPU complexes (e.g., CPU complexes 104A-N of FIG. 1). The compartmentalization of these components is for illustrative purposes. In other embodiments, these components may be located on the same silicon, same chip and/or same board within computing system 100. For example, the private memory 214 may be located within the platform security complex 105 and not within the memory subsystem 106.

In one embodiment, the cryptographic coprocessor 202 further includes a master random number generator (master RNG) 203 to generate entropy in the form of random numbers to generate seed values for each of the core processors' 220A-N core deterministic random bit generators (core DRBG) 222A-N. The RNG 203, according to one embodiment, includes a noise source 204, and entropy accumulator 205, controller logic 206, and an encryption block 207. The noise source 204 captures non-deterministic noise samples from naturally occurring or other sources, for example ring oscillators, keyboard or mouse inputs, etc.). Entropy accumulator 205 may then turn the noise samples into high quality entropy using National Institute of Standards and Technology (NIST) approved methods. In one embodiment, the entropy feeds the encryption block 207 to produce random numbers that comply with industry standards, such as the 256-bit Advanced Encryption Standard (AES) encryption 256 to generate 128-bit random numbers. Other embodiments utilize other compliant methods, such as Secure Hash Algorithms (SHA) or other AES lengths.

In one embodiment, controller logic 206 controls the output generation of random numbers that will be used as seed values for each core processor, such as seed values 216A-N for core DRBGs 222A-N, respectively. The controller logic 206 is connected to a memory controller 212 to manage the storage of the seed values 216A-N in a private memory 214 that may be accessed by the DRBGs 222A-N.

Each core DRBG 222A-N, according to one embodiment, includes controller logic 224A-N, respectively, to control the output generation of random numbers. As a result, the output of each core DRBG 222A-N may be used to implement processor instructions. Additionally, the controller logic 224A-N may include various other logic, such as one or more counters 225A-N and decision logic, to generate and detect trigger events. For example, a counter and logic may be used to determine if a threshold count up or count down time has been reached, or if a threshold number of random numbers generated has been reached. In various embodiments, the CPU Complex's DRBG may be implemented as dedicated logic or use existing execution capabilities of the CPU complex, for example, the execution capabilities of the core processors 220A-N.

For simplicity, FIG. 2 only shows one CPU complex, but the cryptographic coprocessor 202, memory controller 212, and the private memory 214 may be coupled to, and in communication with, a plurality of CPU complexes (e.g., CPU complexes 104A-N of FIG. 1) to realize various embodiments of a split random number generator. Additionally, although each component as shown is coupled by individual communication links, some or all of the components of FIG. 2 may be coupled to a communication fabric or bus, such as data fabric/bus 101 of FIG. 1 and managed by one or more data fabric or bus controllers, such as the memory controller 212.

In one embodiment, the master RNG 203 in combination with memory controller 212 generates new seed values based on the value of flags 217A-N. In one embodiment, each flag 217A-N uniquely corresponds to a core processor and a seed value in memory. For example, when the core DRBG 222A retrieves seed value 216A it sets the corresponding flag 217A to indicate the seed value 216A has been retrieved. In one embodiment, the memory controller 212 reads the value stored in flag 217A and if it indicates the value has been retrieved, that signals the master RNG 203 to generate and store into the memory 214 a new seed value to refresh or replace seed value 216A, then set the flag 217A to indicate the new seed value is available. The core DRBG 222A includes controller logic 224A that may periodically, for example based on detecting a trigger event, check the value of flag 217A. If the value indicates a new value is available, the core DRBG 222A will read and use the seed value 216A that was updated by the master RNG 203 for its next random number generation (e.g., execution of an RDRND) and again set the flag 217A to indicate the seed value 216A has been retrieved. If the value indicates a new seed value is not available, the core DRBG 222A will continue with an internal reseed value to generate the next random number without using an updated seed value from the master.

In an embodiment where the core DRBGs (e.g., DRBGs 222A-N) determine when to retrieve a new seed value, the process does not disrupt certain performance aspects of the computing system 100. Each core processor (e.g., core processor 220A) initiates the retrieval when it is triggered and needs a seed value, for example, a counter threshold has been met and the core processor is responding to a read random number instruction (RDRAND). Additionally, when a core processor does need a new seed value, the core processor does not have to generate the new seed value internally, which would interrupt the core processor and create overhead in the system.

Figure 3:
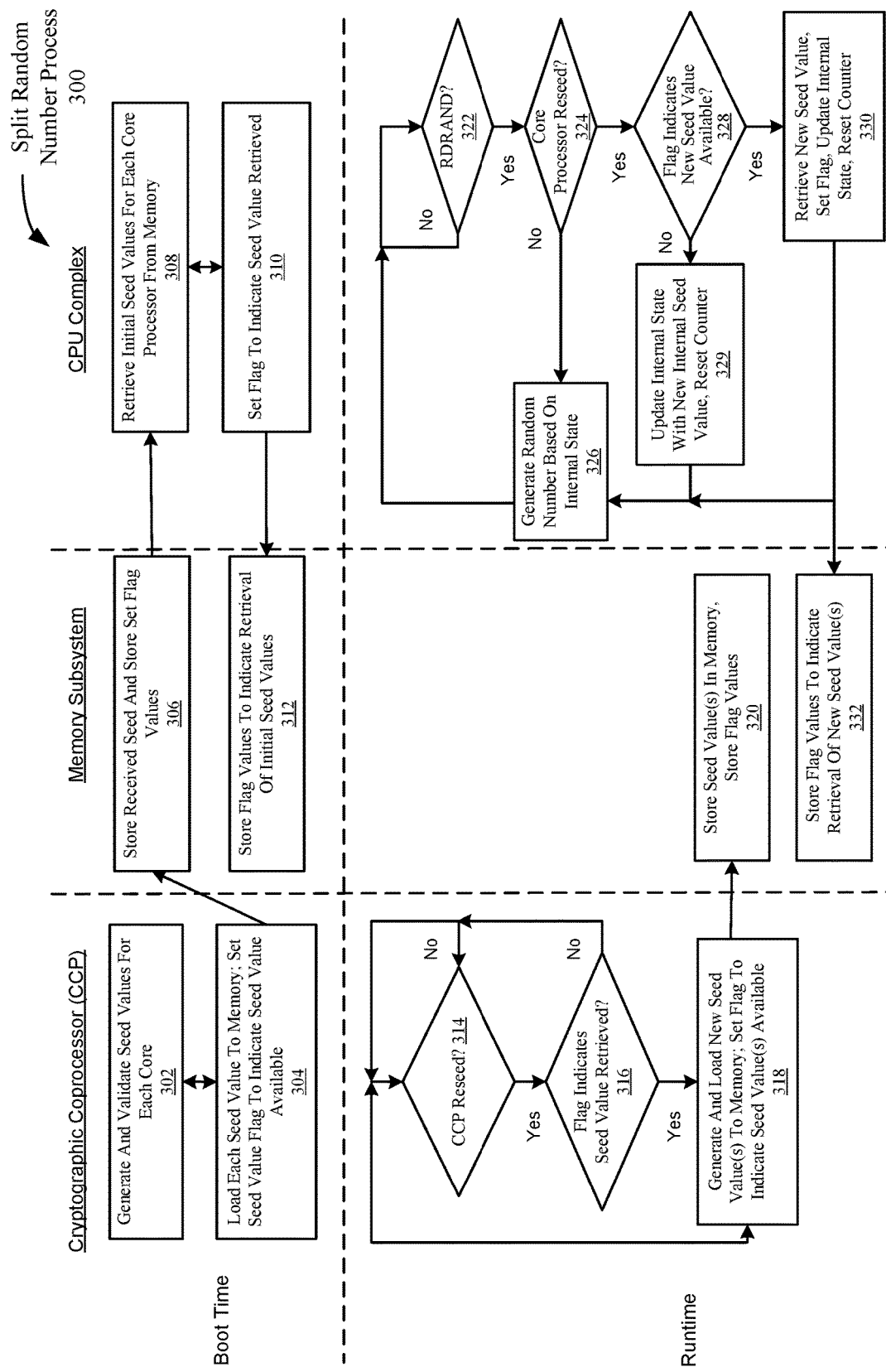
FIG. 3 illustrates an embodiment of a split random number process that may be executed by various components of computer system.

FIG. 3 illustrates an embodiment of a split random number process 300 that may be executed by various components of computing system 100, specifically, the CPU complexes 104A-N, platform security complex 105, and the memory subsystem 106 and their respective components, as shown in FIGS. 1 and 2. The split random number process 300 begins with an initialization at boot time, starting at block 302, where the random number seed generator (e.g., cryptographic coprocessor 202) generates seed values and verifies the seed values are valid.

At block 304, the random number seed generator communicates or loads each seed value and corresponding flag value to the memory (e.g., seed value 216A-N, flag 217A-N and private memory 214 of FIG. 2). As such, each flag uniquely corresponds to a core processor and a seed value in the memory. At block 306, the memory receives the seed values and sets the values of each associated flag to indicate to each corresponding core processor and DRBG (e.g., core processors 220A-N and core DRBGs 222A-N of FIG. 2) a seed value is available for retrieval. In various embodiments, the value of the flag may be stored in the same private memory, or in a separate register or memory within the memory subsystem, platform security complex, or other component of computing system 100.

At block 308 within the boot time sequence, each core processor of CPU complex (e.g., core processor 220A of FIG. 2) retrieves its respective seed value from memory. Then, at block 310, the core processors set their respective flags to indicate the seed value was retrieved, which is updated at block 312 in the memory. The boot time process completes and transitions into a runtime process that includes, according to one embodiment, the cryptographic coprocessor and each core processor of each CPU complex running a respective reseeding process.

Beginning at runtime, at block 314, the cryptographic coprocessor (e.g., cryptographic coprocessor 202 of FIG. 2) checks and determines if it is time to reseed the core processors within each CPU complex. In one embodiment, a cryptographic coprocessor (CCP) reseed event may be triggered by monitoring an internal counter 209 and executing a CCP reseed when the counter 209 hits a threshold value. In various other embodiments, the counter 209 may reside outside the cryptographic coprocessor, be configured to count for an approximate time value, or the trigger may be event based, such as receiving a signal from a CPU complex or other component within computing system 100 of FIG. 1.

Returning to block 314, if a CCP reseed event is not triggered, then the execution returns to the start of block 314. If a CCP reseed event is triggered, then at block 316, the cryptographic coprocessor reads the flag value associated with each processor core of each CPU complex to check and determine if the processor core needs a new seed value. If no, the process returns to block 314 and waits for the next CCP reseeding event. If yes, the process continues to block 318 where the cryptographic coprocessor generates and stores new seed values to the memory and sets each corresponding flag to indicate the seed value is new and available for the associated core processor, which is shown in the memory at block 320. In one embodiment, the cryptographic coprocessor is configured to check, generate, and store new seed values for a selected subset of core processors for each CCP reseed trigger event. For example, the cryptographic coprocessor may be configured to only select and check groups of eight core processors per trigger event. Servicing subsets in a staggered approach may prevent a race condition or a slowdown where too many or all of the core processors attempt to retrieve new seed values substantially at the same time.

In one embodiment, concurrent to the cryptographic coprocessor's process, each CPU complex and, specifically, corresponding core processors generate random numbers based on the retrieved seed values and periodically check for new seed values. For simplicity, blocks 322, 324, 326, 328, 329, and 330 are illustrated herein with respect to one core processor, however, each core processor of each CPU complex may execute the process represented by these blocks concurrently, in order, in groups, or any combination thereof.

Beginning at block 322, the core processor's DRBG (e.g., 222A illustrated in FIG. 2) waits for an instruction to generate a random number (e.g., RDRAND), if it does not receive the instruction it stands by until it does. When it receives the instruction to generate a random number the process continues, at block 324, the core processor (e.g., core processor 220A), checks and determines if it needs a new seed value for its DRBG. In one embodiment, a core processor reseed event may be triggered by monitoring the internal counter (e.g., counters 225A-N) and executing a core processor reseed when the counter hits a threshold value. In various other embodiments, the counter may reside outside the core processor, be configured to count for an approximate time value or a number of random numbers generated, or the trigger may be event based, such as receiving a signal from the cryptographic coprocessor or other component within computing system 100 of FIG. 1.

Returning to block 324, if a core processor reseed event is not triggered, then the random number generation execution proceeds to block 326 and a random number is generated based on the DRBG's internal state and returns to block 322 and awaits another instruction. If a core processor reseed event is triggered, then at decision block 328, the core processor reads the flag value associated with its processor core to determine if the cryptographic coprocessor has uploaded a new seed value to the memory (e.g., cryptographic coprocessor 202, private memory 214 of FIG. 2). If the flag does not indicate that a new seed value is available the process updates, at block 329, the internal state with a new internally generated seed value, resets the counter, and returns to block 326 to complete the instruction based on a DRBG's new internal state. If the flag indicates that a new seed value is available, the process continues to block 330 where the core processor retrieves a new seed value from the memory and sets the corresponding flag to indicate the new seed value was retrieved, which is shown set in the memory at block 332. In one embodiment, setting the flag value in block 330 provides an indication to the cryptographic coprocessor in its next iteration of blocks 314-318 that the core processor has retrieved its seed value and is ready for another new seed value.

Additionally, at block 330, the process updates the internal state of the DRBG and resets the counter. In one embodiment, updating the internal state with the new seed value includes mixing the new seed value into the current state value using a logic function, such as an exclusive OR (XOR).

In various embodiments, the split random number process 300 may be split among the processing elements. For example, the cryptographic coprocessor and each core processor may have shared access to the memory but independently execute its own code within the split random number process 300. In other embodiments, each component may be directed by another component or system code, or some combination of independent and shared code within computing system 100 to realize the same or similar functionality of the split random number process 300.

A computer system includes a master random bit generator to generate a plurality of seed values, each seed value uniquely corresponding to one of a plurality of core processors coupled to the master random bit generator. Each core processor includes a core random bit generator to retrieve one of the plurality of seed values generated by the master random bit generator.

The computer system also includes a platform security complex coupled to a memory. The platform security complex includes the master random bit generator and stores the generated plurality of seed values and a first value of a flag in the memory. Each flag uniquely corresponds to a seed value and a core processor of the plurality of core processors, and the first value indicates a new seed value in the memory.

In the computer system, each core processor retrieves at least one of the plurality of seed values and checks the value of the flag corresponding to the core processor, retrieves the seed value corresponding to the flag and the core processor from the memory when the value of the flag is the first value, and sets the flag from the first value to a second value to indicate the new seed value was retrieved by the core processor.

In the computer system, the platform security complex also checks each value of at least a portion of the flags corresponding to the plurality of core processors, generates and writes new seed values into the memory when the value of the flag is the second value, and sets the value of the flag from the second value to the first value.

The computer system also includes a counter to generate a trigger event to initiate the check of each value of at least a portion of the flags corresponding to the plurality of core processors.

In the computer system, the plurality of core processors is located in one or more CPU complexes.

In the computer system, the core random bit generator for each core processor checks a memory for the seed value corresponding to the core processor based on a trigger event.

In the computer system, each core processor includes a counter configured to generate the trigger event when a value of the counter reaches a threshold.

A method includes generating a plurality of seed values, storing the plurality of seed values in a memory, each seed value uniquely corresponding to one of a plurality of core processors, retrieving from the memory, by at least a portion of the plurality core processors, a corresponding seed value, and generating a random number based on the retrieved corresponding seed value.

The method also includes determining which of the plurality of core processors retrieved a corresponding seed value, and generating new seed values for at least a portion of the memory corresponding to the determined retrieved seed values.

The method also includes generating the new seed values based on detecting a trigger event.

The method also includes selecting a subset of the plurality of core processors for the determining of which of the plurality of core processors retrieved a corresponding seed value.

In the method, determining which of the plurality of core processors retrieved a corresponding seed value also includes, for each core processor, reading a flag value that is set to a first value indicating that the corresponding seed value was retrieved by the core processor, and after the generating of the new seed values, changing the flag value from the first value to a second value to indicate a new seed value available for retrieval.

In the method, the retrieving of the corresponding seed value from the memory is based on detecting a trigger event.

In the method, the detecting of the trigger event includes detecting that a counter has reached a threshold time limit.

In the method, the detecting of the trigger event includes detecting that a number of random numbers generated based on the retrieved corresponding seed value has reached a threshold value.

A random number generator includes a master random bit generator to generate seed values and to store the seed values in a memory, and a plurality of core processors. Each core processor includes a core random bit generator to generate random numbers based on the seed values generated by the master random bit generator.

The plurality of core processors retrieves a corresponding seed value from the memory at a memory location that uniquely corresponds to each core processor of the plurality of core processors.

In the random number generator, the master random bit generator also determines which seed values to generate based on a corresponding flag value set by each core random bit generator.

In the random number generator, each core random bit generator is configured to retrieve a corresponding seed value generated by the master random bit generator based on a corresponding flag value set by the master random bit generator.

The embodiments described herein may include various operations and processes. These may be performed by hardware components, software, firmware, or a combination thereof. As used herein, the term "coupled to" may mean coupled directly or indirectly through one or more intervening components. Any of the signals provided over various lines and buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the split random number generator 200 and/or portions thereof carried on the computer-readable storage medium may be a database or other data structure which can be read by a program and used, directly or indirectly, to fabricate the hardware comprising the split random number generator 200. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the split random number generator 200. The netlist may then be placed and routed to produce a data set describing geometric shapes to be applied to masks. The masks may then be used in various semiconductor fabrication steps to produce a semiconductor circuit or circuits corresponding to the split random number generator 200. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader spirit and scope of the embodiments as set forth in the appended claims. The specification and drawings are, accordingly, to be regarded in an illustrative sense rather than a restrictive sense.

What is claimed is:

1. A computer system, comprising:
a master random number generator circuit residing outside a plurality of core processors coupled with the master random number generator circuit, and configured to generate a seed value uniquely corresponding to each core processor of the plurality of core processors,
wherein each core processor of the plurality of core processors is configured to retrieve a corresponding seed value generated by the master random number generator circuit.

2. The computer system of claim 1, further comprising a platform security complex coupled to a memory, wherein the platform security complex comprises the master random number generator circuit and is configured to:
store the corresponding seed value and a first value of a flag in the memory, wherein the flag uniquely corresponds to the corresponding seed value for each core processor of the plurality of core processors, and the first value indicates a new seed value in the memory.

3. The computer system of claim 2, wherein each core processor of the plurality of core processors to retrieve the corresponding seed value is further configured to:
check a value of the flag corresponding to the core processor;
retrieve the corresponding seed value corresponding to the flag and the core processor from the memory when the value of the flag is the first value; and
set the flag from the first value to a second value to indicate the new seed value was retrieved by the core processor.

4. The computer system of claim 3, wherein the platform security complex is further configured to:
check a value of the flag corresponding to each core processor of the plurality of the core processors;
generate and write new seed values into the memory when the value of the flag is the second value; and
set the value of the flag from the second value to the first value.

5. The computer system of claim 4, further comprising a counter configured to generate a trigger event to initiate checking the value of the flag corresponding to each core processor of the plurality of the core processors.

6. The computer system of claim 1, wherein the plurality of core processors is located in one or more CPU complexes.

7. The computer system of claim 1, wherein a core random bit generator for each core processor is configured to check a memory for the seed value corresponding to each core processor based on a trigger event.

8. The computer system of claim 7, wherein each core processor includes a counter configured to generate the trigger event when a value of the counter reaches a threshold.

9. A method, comprising:
generating a plurality of seed values in a master random number generator circuit residing outside a plurality of core processors;
storing the plurality of seed values in a memory coupled with the master random number generator circuit, each seed value of the plurality of seed values uniquely corresponding to one core processor of the plurality of core processors;
retrieving from the memory, by one core processor of the plurality of core processors, a corresponding seed value; and
in the one core processor, generating a random number based on the corresponding seed value.

10. The method of claim 9, further comprising:
determining which core processors of the plurality of core processors retrieved a corresponding seed value; and
generating new seed values for at least a portion of the memory corresponding to determining which core processors retrieved seed values.

11. The method of claim 10, further comprising generating the new seed values based on detecting a trigger event.

12. The method of claim 10, further comprising selecting a subset of the plurality of core processors for the determining of which of the core processors retrieved a corresponding seed value.

13. The method of claim 10, wherein determining which of the core processors retrieved a corresponding seed value further comprises, for each core processor:
  reading a flag value that is set to a first value indicating that the corresponding seed value was retrieved by the core processor; and
  after the generating of the new seed values, changing the flag value from the first value to a second value to indicate a new seed value available for retrieval.

14. The method of claim 9, wherein the retrieving of the corresponding seed value from the memory is based on detecting a trigger event.

15. The method of claim 14, wherein the detecting of the trigger event comprises detecting that a counter has reached a threshold time limit.

16. The method of claim 14, wherein the detecting of the trigger event comprises detecting that a number of random numbers generated based on the retrieving of the corresponding seed value has reached a threshold value.

17. A random number generator, comprising:
  a master random number generator circuit configured to generate seed values and to store the seed values in a memory; and
  a plurality of core processors, each core processor of the plurality of core processors comprising a core random bit generator configured to generate random numbers based on one seed value of the seed values generated by the master random number generator circuit, wherein the master random number generator circuit resides outside the plurality of core processors.

18. The random number generator of claim 17, wherein each core processor of the plurality of core processors is configured to retrieve a corresponding seed value from the memory at a memory location that uniquely corresponds each core processor of the plurality of core processors.

19. The random number generator of claim 17, wherein the master random number generator circuit is further configured to determine which seed values to generate based on a corresponding flag value set by each core random bit generator.

20. The random number generator of claim 17, wherein each core random bit generator is configured to retrieve a corresponding seed value generated by the master random number generator circuit based on a corresponding flag value set by the master random number generator circuit.

* * * * *